US006834038B1

(12) United States Patent
Zelig et al.

(10) Patent No.: US 6,834,038 B1
(45) Date of Patent: Dec. 21, 2004

(54) PROTECTION AGAINST MASTER UNIT FAILURE IN REMOTE NETWORK ACCESS MULTIPLEXING

(75) Inventors: David Zelig, Givatayim (IL); Eli Aloni, Zur Yigal (IL); Ron Sdayor, Kiryat Ono (IL); Menahem Kaplan, Petah-Tikva (IL)

(73) Assignee: Orckit Communications Ltd., Tel Aviv (IL)

( * ) Notice: Subject to any disclaimer, the term of this patent is extended or adjusted under 35 U.S.C. 154(b) by 882 days.

(21) Appl. No.: 09/637,757

(22) Filed: Aug. 11, 2000

(51) Int. Cl.[7] .............................................. G06F 11/00
(52) U.S. Cl. ........................... 370/217; 370/221; 714/2
(58) Field of Search ................................ 370/216–228, 370/535–542, 395.1, 463, 465, 351–356, 432, 389–392; 714/1–2

(56) References Cited

U.S. PATENT DOCUMENTS

| | | | | |
|---|---|---|---|---|
| 5,283,782 A | * | 2/1994 | Takase et al. ................ | 370/219 |
| 5,436,886 A | * | 7/1995 | McGill ......................... | 370/219 |
| 5,663,949 A | * | 9/1997 | Ishibashi et al. ............. | 370/220 |
| 5,796,717 A | * | 8/1998 | Shinbashi et al. ........... | 370/216 |
| 6,075,767 A | * | 6/2000 | Sakamoto et al. ........... | 370/228 |
| 6,314,102 B1 | * | 11/2001 | Czerwiec et al. ............ | 370/463 |
| 6,351,452 B1 | * | 2/2002 | Koenig et al. ............... | 370/217 |
| 6,438,144 B1 | * | 8/2002 | Guzikevits et al. .......... | 370/535 |
| 6,466,576 B2 | * | 10/2002 | Sekine et al. ................ | 370/217 |
| 6,597,689 B1 | * | 7/2003 | Chiu et al. ................ | 370/395.1 |
| 6,680,904 B1 | * | 1/2004 | Kaplan et al. ............... | 370/217 |
| 6,687,231 B1 | * | 2/2004 | Czerwiec et al. ............ | 370/228 |

FOREIGN PATENT DOCUMENTS

| | | |
|---|---|---|
| EP | 1 006 702 A2 | 6/2000 |
| EP | 1006702 * | 6/2000 |
| WO | WO-99/04596 A1 | 1/1999 |
| WO | WO 9904596 * | 1/1999 |

OTHER PUBLICATIONS

ATM Forum, Inverse Multiplexing for ATM Specification Version 1.1, pp. 1–8.*
Delpapa, DSLAM—A broadband Digital Subscriber Line Acess Multiplexer System, NEC, pp. 103–107.*
"Inverse Multiplexing for ATM (IMA) Specification Version 1.1", ATM Forum. 'Online! Mar. 1999.
Papa Del J, et al., "DSLAM—A Broadband Digital Subscriber Line Access Multiplexer System", NEC Research and Development, Nippon Electric LTD. Tokyo, Japan, vol. 40, No. 1, Jan. 1999, pp. 103–107.
Standard ITU–T G.783 of the International Telecommunications Union (1994), entitled "Characteristics of Synchronous Digital Hierarchy (SDH) Equipment Funtional Blocks", Sep. 1999, pp. 1–3.
AF–PHY–0086.001, ATM Forum Technical Committee, Inverse Multiplexing for ATM (IMA) Specification Version 1.1., Mar. 1999, pp. 1–185.

* cited by examiner

*Primary Examiner*—Steven Nguyen
(74) *Attorney, Agent, or Firm*—Darby & Darby

(57) ABSTRACT

Network access apparatus includes a slave unit, including a plurality of subscriber ports adapted to be linked to respective subscriber lines, and a multiplexer for multiplexing among the ports. A master sub-system, is connected to at least one trunk line of a first public network, in a location remote from the slave unit. The master sub-system includes a first master unit, adapted to communicate with the slave unit via an assigned link through a second public network, so as to provide users of the subscriber lines with access to the first public network through the at least one trunk line. The master sub-system also includes a second master unit, coupled through the first master unit to communicate with the slave unit via the assigned link, so as to provide the users with access to the first public network through the at least one trunk line in the event of a failure associated with the first master unit.

25 Claims, 3 Drawing Sheets

PROTECTION AGAINST MASTER UNIT FAILURE IN REMOTE NETWORK ACCESS MULTIPLEXING

FIELD OF THE INVENTION

The present invention relates generally to high-speed data communication systems, and specifically to Digital Subscriber Line systems.

BACKGROUND OF THE INVENTION

Digital Subscriber Line (DSL) is a modem technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. DSL thus opens the most critical bottleneck in local-loop access to high-speed networks, such as Asynchronous Transfer Mode (ATM) and Internet Protocol (IP) networks, without requiring major investments in new infrastructure. A range of DSL standards have been defined, known generically as "xDSL," wherein the various standards have different data rates and other associated features but share common principles of operation.

DSL subscribers are connected to high-speed networks through Digital Subscriber Line Access Multiplexer (DSLAM) systems. Because of the high cost of network bandwidth, a single DSLAM must typically be designed to serve between 100 and 1000 subscribers and to concentrate their traffic through one or a few network trunks. The need to serve such a large and potentially variable number of subscribers in the one DSLAM has led to the development of "multi-shelf" access architectures. Multi-shelf systems are built around a master unit, which communicates with a core network, such as an ATM network. The master unit multiplexes downstream and upstream packets, or cells, among multiple shelves, referred to herein as slave units. Each master or slave unit comprises a shelf unit, a concentrator unit, a plurality of subscriber ports serving respective subscriber premises via suitable DSL modems, and other ports used to connect the shelves to one another and/or to the network.

In order to maintain the transmission speeds and quality of service prescribed by xDSL standards, the modems associated with the ports of the slave units must be within a certain maximum distance (expressed in terms of the required run of copper-wire cable) from subscriber premises. On the other hand, the elements of the DSLAM are costly, and it is uneconomic to deploy the entire system in an area in which there are relatively few subscribers to serve. Therefore, some multi-shelf systems are designed for extension, whereby one or more slave units (shelves) are located remote from the master unit and provide network access to subscribers in the remote area. A moderate- to high-speed link connects each of the remote slave units to the master.

FIG. 1 is a block diagram that schematically illustrates a DSLAM system 21 offering access to an ATM network 22. System 21 comprises a master unit 20, which communicates with network 22 via a high-speed trunk 23 and multiplexes among slaves 30. The master unit comprises a network interface block 24, which includes a physical layer (PHY) and data link layer (ATM) interface, communicating with the network core. It also performs virtual path/virtual circuit identifier (VPI/VCI) translation and other higher-layer functions. These elements are well known in the ATM art.

A failure in the network interface of master 20 will interrupt service to the hundreds or thousands of subscribers who are served by system 21. For this reason, in DSLAM systems known in the art, block 24 typically comprises two network interfaces (not shown explicitly in the figure), one active and one standby, both connected to network 22. Generally, these interfaces are designed to function in accordance with standard ITU-T G.783 of the International Telecommunications Union (1994), entitled "Characteristics of Synchronous Digital Hierarchy (SDH) Equipment Functional Blocks," which is incorporated herein by reference. In a "1+1" configuration, which is most commonly used for this purpose, master unit 20 receives data on both of the interfaces and can send data on either interface, as well. When another entity with which the master unit is communicating over network 22 finds that the performance of the active interface has degraded, it signals the master unit to switch interfaces, in a manner that is described by the standard. Alternative redundancy schemes for this purpose, such as 1:1 and 1:N, are also defined by the standard. All of these schemes require substantial hardware and software complexity, as well as duplication of resources, but the associated costs are justified by the need to avoid down-time of the master unit.

A concentrator 25 multiplexes among slave units 30, which contain the subscriber ports. Subscribers who are geographically close to master unit 20 are typically served by local slave units (not shown), collocated with master unit 20, or even by ports on the master shelf itself. Remote subscribers, however, are served by remote slave units 30, which communicate with master unit 20 via IMA links, as described above. Each of the remote slave units is served by an IMA interface card 26, via a respective link 40. IMA is described in document AF-PHY-0086.001, promulgated by the ATM Forum (1999), entitled "Inverse Multiplexing for ATM (IMA) Specification Version 1.1," which is incorporated herein by reference. IMA allows data to be transferred to and from one virtual ATM port by multiplexing over a number of parallel physical, point-to-point lines, such as E1 (2.048 Mbps) or T1 (1.544 Mbps) lines. Up to 32 such lines may be used, as stated in the IMA standard, although it is generally economical to use no more than eight lines, with the actual number of lines depending on the required bandwidth. IMA is typically used to serve small, remote sites, such as slaves 30 in FIG. 1, for which a single E1 or T1 line does not give sufficient bandwidth, while a high-rate interface is not needed or economically justified. Card 26 is referred to herein as an IMA-C card. Links 40 typically belong to an existing plesisynchronous digital hierarchy (PDH) network 28, such as E1 or T1 lines provided over a public switched telephone network (PSTN). In accordance with the above-mentioned standard, each of the IMA links may comprise a plurality of such lines, which are multiplexed by card 26.

Each slave unit 30 comprises an IMA interface card 32, referred to herein as an IMA-R card, which communicates over the respective link 40 with the corresponding IMA-C card and similarly multiplexes among the multiple lines making up the link. A concentrator 34 serves a plurality of line cards 36, each of which typically includes a number of subscriber ports. Unlike the above-mentioned SDH protection standards for the connection between master unit 20 and ATM network 22, there is no standardized method of protection against failures in the IMA links between slave units 30 and master unit 20. There is therefore a need for a solution to support protection of remote sites from failure of network interfaces or equipment at the main site.

SUMMARY OF THE INVENTION

It is an object of some aspects of the present invention to provide improved methods and apparatus for multiplexed network access by remote subscribers.

It is a further object of some aspects of the present invention to provide methods and apparatus for protection of such remote subscribers against equipment failures, including failures associated with a network interface at a main site.

In preferred embodiments of the present invention, a multi-shelf access system serves network users, who are coupled thereby to access a high-speed core network, typically an ATM network. The system comprises a master sub-system, which includes two master units, at a main site and at least one remotely-located slave unit, which communicates with the master units over a link, preferably an IMA link through a PDH network. The users communicate with the slave via respective ports, which preferably comprise Digital Subscriber Line (DSL) modems. One of the master units serves as an active unit, through which the slave normally receives data packets from the core network. The other master unit, termed a standby unit, is controlled so as to send packets to the slave only in the event of a failure in the active unit. The standby master is daisy-chained to the active master, so that both of them receive upstream packets sent over the link by the slave. The standby unit discards the upstream packets that it receives, so long as the active unit is operational.

The present invention thus provides a novel solution to the problem of protection against failures of equipment or of the main network interface for a remote network access unit. Preferred embodiments of the present invention have the advantage of ensuring substantially uninterrupted service to network users, even when a failure occurs in the main (master) access unit. The protection is achieved simply and automatically, without the need for messaging between the remote and main units, unlike protection methods known in the art, such as 1+1, 1:1 or 1:N. Although preferred embodiments are described herein with reference to IMA links between the master and remote slave units, the principles of the present invention are similarly applicable to other types of links, as well, which are used to connect a remote user access multiplexing unit over an intermediate network to an endpoint switch of a high-speed network. For example, these principles may be applied in transmission of ATM signals without inverse multiplexing over E1 lines or over DS1, DS3 or other types of interfaces.

Further aspects of protection against failures in remote master/slave network access multiplexing systems are described in the following co-pending U.S. patent applications:

U.S. patent application Ser. No. 09/472,683, entitled "Bi-Directional Chaining of Network Access Ports," filed Dec. 27, 1999;

U.S. patent application Ser. No. 09/637,759, entitled "PTO LETTER, FORMAT M:\ekc\forms\EKC0749.DOC;1," filed Aug. 11, 2000; and U.S. patent application Ser. No. 09/637,758, entitled "Remote Facility Protection in Remote Network Access Multiplexing," filed Aug. 11, 2000.

All of these applications are assigned to the assignee of the present patent application, and their disclosures are incorporated herein by reference.

There is therefore provided, in accordance with a preferred embodiment of the present invention, network access apparatus, including:

a slave unit, including a plurality of subscriber ports adapted to be linked to respective subscriber lines, and a multiplexer for multiplexing among the ports; and a master sub-system, for connection to at least one trunk line of a first public network, in a location remote from the slave unit, and including:

a first master unit, adapted to communicate with the slave unit via an assigned link through a second public network, so as to provide users of the subscriber lines with access to the first public network through the at least one trunk line; and a second master unit, coupled through the first master unit to communicate with the slave unit via the assigned link, so as to provide the users with access to the first public network through the at least one trunk line in the event of a failure associated with the first master unit.

Preferably, the first network includes a packet-switched network, most preferably an Asynchronous Transfer Mode (ATM) network. Further preferably, the second network includes a plesisynchronous digital hierarchy (PDH) network.

Preferably, the link includes a point-to-point interface, most preferably including multiple interfaces through the second network, wherein the master units are adapted to communicate with the slave unit by inverse multiplexing over the multiple interfaces. In a preferred embodiment, the master units are adapted to communicate with the slave unit by inverse multiplexing over ATM (IMA). Preferably, the first and second master units include respective first and second inverse multiplexing interfaces, both coupled to communicate with the slave unit over the assigned link. Further preferably, the first inverse multiplexing interface is configured to bi-cast data packets upstream from the users of the subscriber lines linked to the slave unit to both of the master units, and to merge data packets downstream from both of the master units to the slave unit. Most preferably, the second master unit is adapted to discard the upstream packets and to refrain from sending the downstream packets in the absence of the failure associated with the first master unit.

In a preferred embodiment, the subscriber ports include Digital Subscriber Line (DSL) ports. Typically, the slave unit includes one of a plurality of such slave units communicating with the master units via respective links, and each of the master units includes a multiplexer for multiplexing among the slave units.

Preferably, in the event of the failure associated with the first master unit, the second master unit takes over communication with the slave unit without notification to or from the slave unit of the failure.

There is also provided, in accordance with a preferred embodiment of the present invention, a method for providing network access, including:

connecting first and second master units to respective trunk lines of a first public network;

linking a slave unit, remote from the master unit, to multiplex among a plurality of subscriber lines; and establishing a link to operate through a second public network between the first master unit and the slave unit, so as to provide users of the subscriber lines with access to the first public network; and coupling the second master unit through the first master unit to the link, such that the access is provided by the second master unit in the event of a failure in the first master unit.

The present invention will be more fully understood from the following detailed description of the preferred embodiments thereof, taken together with the drawings in which:

DETAILED DESCRIPTION OF A PREFERRED EMBODIMENT

Figure 1:
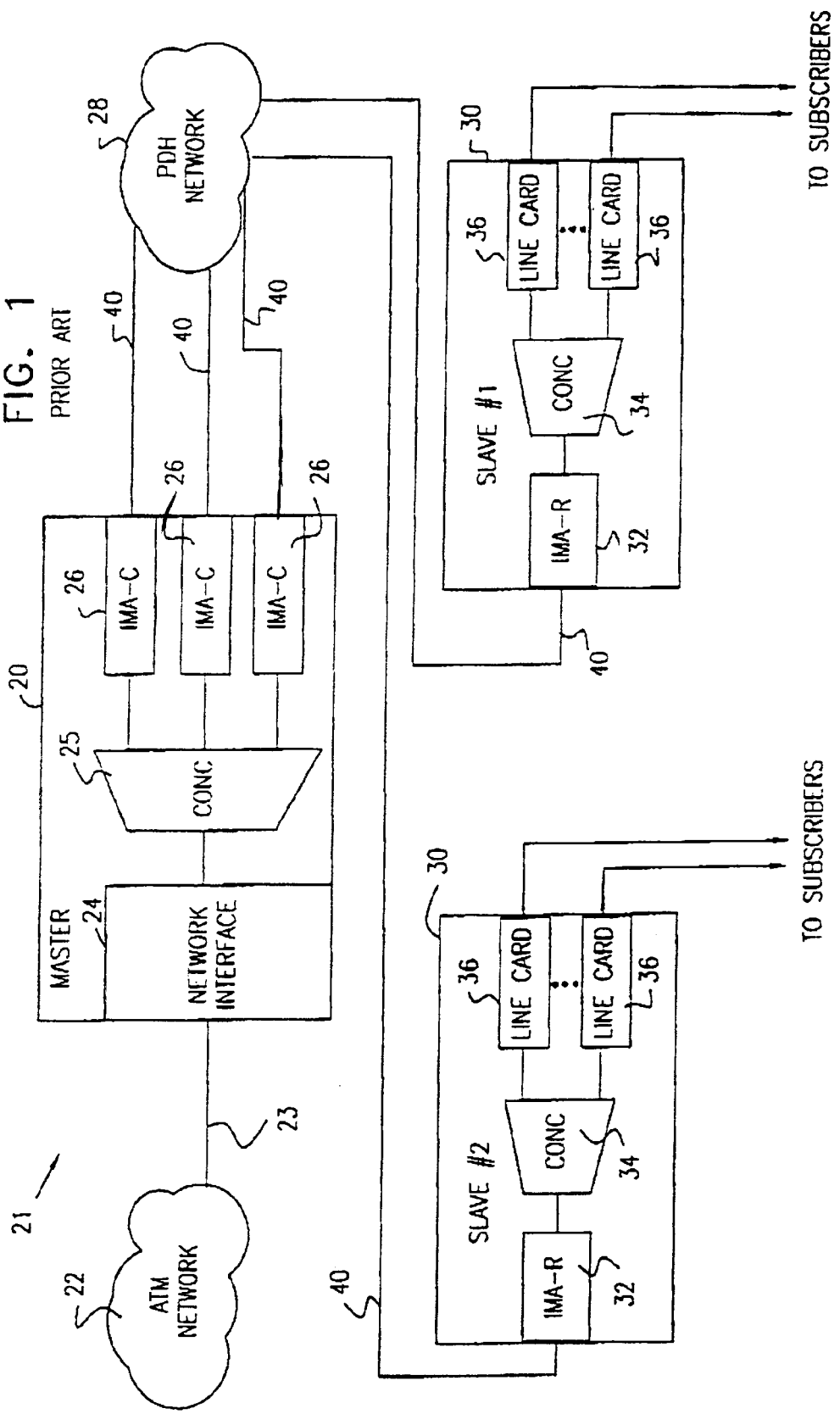
FIG. 1 is a block diagram that schematically illustrates a multi-shelf DSLAM system, as is known in the art.
Figure 2:
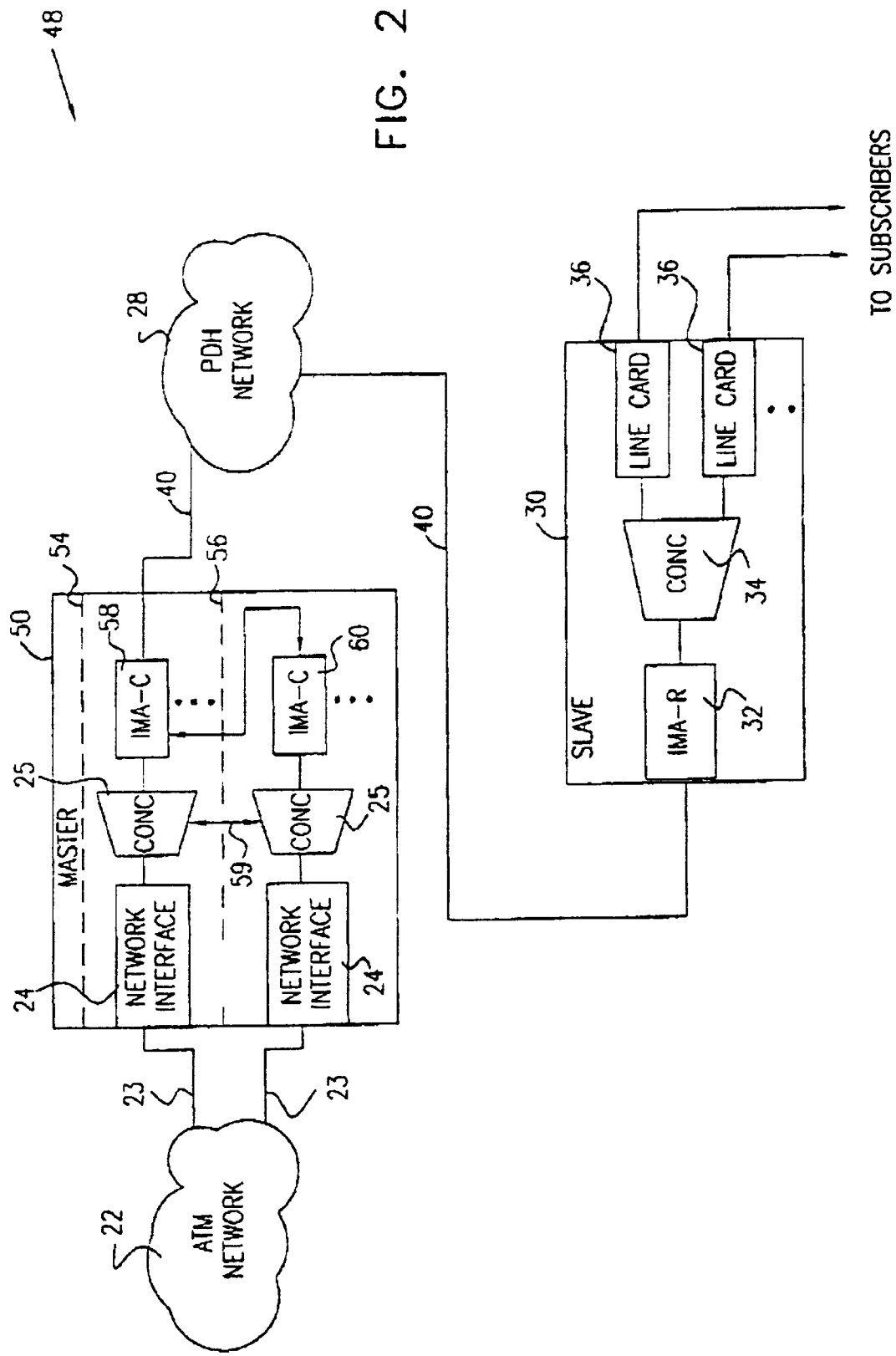
FIG. 2 is a block diagram that schematically illustrates a multi-shelf DSLAM system with IMA link protection, in accordance with a preferred embodiment of the present invention.

Reference is now made to FIG. 2, which is a block diagram that schematically illustrates a multi-shelf DSLAM system 48, in accordance with a preferred embodiment of the present invention. Except where noted hereinbelow, system 48 is substantially similar to system 21, shown in FIG. 1. Therefore, only those aspects of system 48 that are pertinent to unique protection mechanisms exemplified by this system are described here in detail. Further aspects of the operation of system 48 are described in the above-mentioned U.S. patent application Ser. No. 09/472,683, as well as in co-pending U.S. patent application Ser. No. 09/443,157, filed Nov. 18, 1999, entitled "Switch with Serial Output Links and Multi-Dimensional Scheduling," which is assigned to the assignee of the present patent application, and whose disclosure is incorporated herein by reference.

System 48 is shown to comprise a master sub-system 50 and slave unit 30. Although only the single slave 30 is shown for simplicity, it will be understood that multiple slaves may be linked to the master in like manner. Sub-system 50 comprises an active master unit 54 and a standby master unit 56. Each of master units 54 and 56 comprises its own network interface 24 and concentrator 25, connected to a respective IMA-C interface card 58 or 60. Master sub-system 50 preferably include means for 1+1 network interface protection, most preferably as described in the above-mentioned U.S. patent application Ser. No. 09/472,683. The two interfaces 24 are typically connected to ATM network 22 by different, respective fiber trunks 23, but are seen by the network as a single logical interface.

Both of IMA-C interface cards 58 and 60 communicate with IMA-R card 32 over the same link 40. In normal operation, however, only concentrator 25 of the active master unit sends downstream packets to the slave. As long as normal operation persists, the active concentrator instructs the concentrator of the standby master unit, via a protection interface 59 between the concentrators, not to transmit downstream packets over the respective link 40, and to discard the upstream packets that it receives. In the event of a fault in concentrator 25 (or in other elements of unit 54) or a need for protection on links 23, however, the standby concentrator detects that the fault has occurred, using interface 59, and takes over the role of the active concentrator. Preferably, the transfer of functions between the concentrators is transparent to slave 30.

Figure 3:
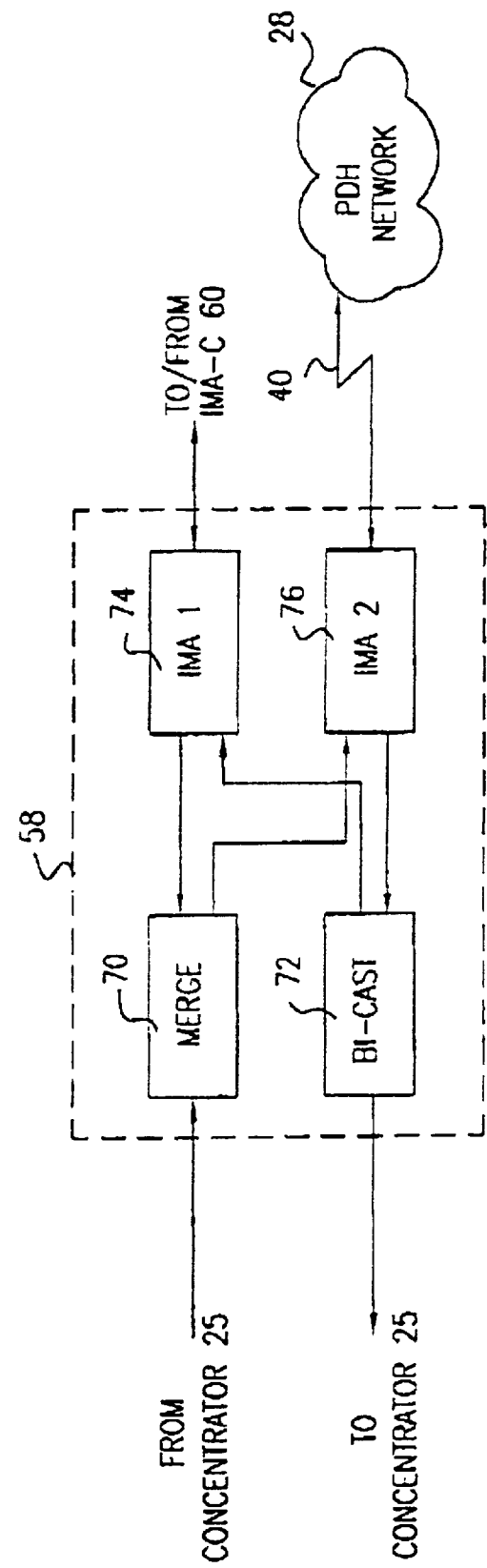
FIG. 3 is a block diagram showing details of an IMA interface unit in the system of FIG. 2, in accordance with a preferred embodiment of the present invention.

FIG. 3 is a block diagram that schematically shows details of IMA-C card 58, in accordance with a preferred embodiment of the present invention. The card comprises two IMA interface units 74 and 76. Unit 76 is connected to link 40 and multiplexes among the multiple lines of the link. Unit 74 is connected to IMA-C card 60 in a daisy chain configuration, thus coupling card 60 to link 40 through unit 76. Downstream packets received by units 74 and 76 (through respective concentrators 25 of master units 56 and 54) are merged by a demultiplexer 70. In fact, as noted above, master units 54 and 56 are controlled so that only one of them sends packets over link 40 at any given time. Because of demultiplexer 70, however, switching between the master units is transparent to slave 30. The return packet stream received over link 40 from the slave through IMA unit 76 is duplicated by a bi-cast block 72, so that a copy of each packet is sent to the respective concentrator 25 in each of the active and standby master units. The redundant packets are discarded by the standby master unit, as noted above.

Although preferred embodiments are described herein with reference to IMA links 40 between master 50 and slave 60, the principles of the present invention are similarly applicable to other types of remote network links, as well, as are known in the art. Such links may include (but are not limited to) E1, T1, E3, DS3 or substantially any other standard or non-standard link for transmission of packets or ATM cells, with or without inverse multiplexing. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Network access apparatus, comprising:
   a multiplicity of slave units, each comprising a plurality of subscriber ports adapted to be linked to respective subscriber lines, and a multiplexer for multiplexing among the ports; and
   a master sub-system, for connection to at least one trunk line of a first public network, in a location remote from the slave units, the master sub-system comprising:
      a first master unit, comprising:
         a first subscriber link interface, which is adapted to communicate with the slave units via assigned links through a second public network, so as to provide users of the subscriber lines with access to the first public network through the at least one trunk line; and
         a first multiplexer, for multiplexing among the slave units; and
      a second master unit, comprising:
         a second multiplexer, for multiplexing among the slave units; and
         a second subscriber link interface, which is coupled through the first subscriber link interface to communicate with the slave units via the assigned links, so as to provide the users with access to the first public network through the at least one trunk line in the event of a failure associated with the first master unit.

2. Apparatus according to claim 1, wherein the first public network comprises a packet-switched network.

3. Apparatus according to claim 2, wherein the packet-switched network comprises an Asynchronous Transfer Mode (ATM) network.

4. Apparatus according to claim 3, wherein the second public network comprises a plesisynchronous digital hierarchy (PDH) network.

5. Apparatus according to claim 1, wherein the links comprise at least one point-to-point interface.

6. Apparatus according to claim 5, wherein the links comprise multiple interfaces through the second public network, and wherein the master units are adapted to communicate with the slave units by inverse multiplexing over the multiple interfaces.

7. Apparatus according to claim 6, wherein the first public network comprises an Asynchronous Transfer Mode (ATM) network, and wherein the master units are adapted to communicate with the slave units by inverse multiplexing over ATM (IMA).

8. Apparatus according to claim 6, wherein the first and second master units comprise respective first and second inverse multiplexing interfaces, both coupled to communicate with the slave units over the assigned links.

9. Apparatus according to claim 8, wherein the first inverse multiplexing interface is configured to bi-cast data packets upstream from the users of the subscriber lines linked to the slave units to both of the master units, and to merge data packets downstream from both of the master units to the slave units.

10. Apparatus according to claim 9, wherein the second master unit is adapted to discard the upstream packets and to refrain from sending the downstream packets in the absence of the failure associated with the first master unit.

11. Apparatus according to claim 1, wherein the subscriber ports comprise Digital Subscriber Line (DSL) ports.

12. Apparatus according to claim 1, wherein in the event of the failure associated with the first master unit, the second master unit takes over communication with the slave units without notification to or from the slave unit of the failure.

13. Apparatus according to claim 1, wherein the first and second master units comprise respective first and second network interfaces, which are respectively connected to first and second trunk lines of the first public network.

14. A method for providing network access, comprising:

connecting first and second master units via respective first and second network interfaces to respective trunk lines of a first public network;

linking a multiplicity of slave units, remote from the master unit, so that each of the slave units is configured to multiplex among a plurality of subscriber lines; and establishing respective links to operate through a second public network between a subscriber link interface of the first master unit and the multiplicity of slave units;

providing respective first and second multiplexers in the first and second master units, for multiplexing among the slave units, so as to provide users of the subscriber lines with access to the first public network; and coupling the second master unit through the subscriber link interface of the first master unit to the respective links, such that the access is provided by the second master unit in the event of a failure in the first network interface or multiplexer.

15. A method according to claim 14, wherein the first public network comprises a packet-switched network.

16. A method according to claim 15, wherein the packet-switched network comprises an Asynchronous Transfer Mode (ATM) network.

17. A method according to claim 16, wherein the second public network comprises a plesisynchronous digital hierarchy (PDH) network.

18. A method according to claim 14, wherein establishing the respective links comprises establishing a link over a point-to-point interfaces.

19. A method according to claim 18, wherein establishing the respective links comprises performing inverse multiplexing over multiple lines through the second public network between the master units and the slave units.

20. A method according to claim 14, wherein linking the multiplicity of slave units to the subscriber lines comprises providing Digital Subscriber Line (DSL) service.

21. A method according to claim 14, wherein coupling the second master unit comprises bi-casting data packets received upstream from the slave units to both of the first and second master units and merging data packets sent downstream from the first and second master units.

22. A method according to claim 21, wherein coupling the second master unit comprises discarding the data packets received by the second master unit in the absence of the failure in the first master unit.

23. A method according to claim 14, wherein coupling the second master unit comprises, in the absence of the failure in the first master unit, refraining from transmitting packets downstream from the second master unit to the slave units.

24. A method according to claim 23, wherein coupling the second master unit comprises, in the event of the failure in the first master unit, initiating transmission of the packets downstream from the second master unit.

25. A method according to claim 14, wherein coupling the second master unit comprises transferring communications so as to provide the users of the subscriber lines with access to the first public network through the second master unit in the event of the failure, in a manner substantially transparent to the slave units.

\* \* \* \* \*